United States Patent [19]
Kim

[11] Patent Number: 5,779,197
[45] Date of Patent: Jul. 14, 1998

[54] APPARATUS FOR DETACHABLY MOUNTING AUDIO EQUIPMENT

[75] Inventor: Ji-Seop Kim, Seoul, Rep. of Korea

[73] Assignee: Daewoo Electronics Co., Ltd., Rep. of Korea

[21] Appl. No.: 864,110

[22] Filed: May 28, 1997

[30] Foreign Application Priority Data

May 28, 1996 [KR] Rep. of Korea ............... 1996-13366

[51] Int. Cl.$^6$ ............................................. G12B 9/00
[52] U.S. Cl. ........................................ 248/27.1; 296/70
[58] Field of Search .................... 248/27.1, 27.3; 296/70; 455/345; 312/245

[56] References Cited

U.S. PATENT DOCUMENTS

| | | | |
|---|---|---|---|
| 4,557,818 | 12/1985 | Clarisse | 248/27.3 |
| 4,784,361 | 11/1988 | Kobayashi et al. | 248/551 |
| 4,993,668 | 2/1991 | Inamura | 248/27.3 |
| 5,216,904 | 6/1993 | Isaki | 70/58 |
| 5,381,684 | 1/1995 | Kawamura | 248/27.3 X |

*Primary Examiner*—Ramon O. Ramirez
*Attorney, Agent, or Firm*—Cushman Darby & Cushman Intellectual Property Group of Pillsbury Madison & Sutro, LLP

[57] ABSTRACT

An improved apparatus for detachably mounting audio equipment by which a main chassis in which audio equipment is accommodated is firmly mounted to a mounting frame, and in which the main chassis is easily and accurately disengaged from the mounting frame by disengagement members. Engagement members are unrotatably fixed to the main chassis by two screws respectively, and the main chassis is detachably mounted to the mounting frame when the engagement members are engaged with engagement apertures formed on the mounting frame. When the main chassis is drawn from the mounting frame, the disengagement members are inserted into insertion holes formed on a front panel and tip ends of the disengagement members make contact with inclined portions of the engagements, thereby resiliently bending deformable portions of the engagement members. Lock claws formed in the disengagement members are disengaged from the engagement apertures of the mounting frame when the deformable portions of the engagement members are bent. The tip ends of the disengagement members are engaged with latching portions formed in the main chassis so as to be pulled together with the main chassis. According to the apparatus, the main chassis is firmly mounted to the mounting frame. When the disengagement members are pulled, the main chassis is easily drawn by the latching portions of the main chassis. Damages to the engagement members during the pulling of the disengagement members is prevented, and the main chassis and the engagement members are easily manufactured.

19 Claims, 9 Drawing Sheets

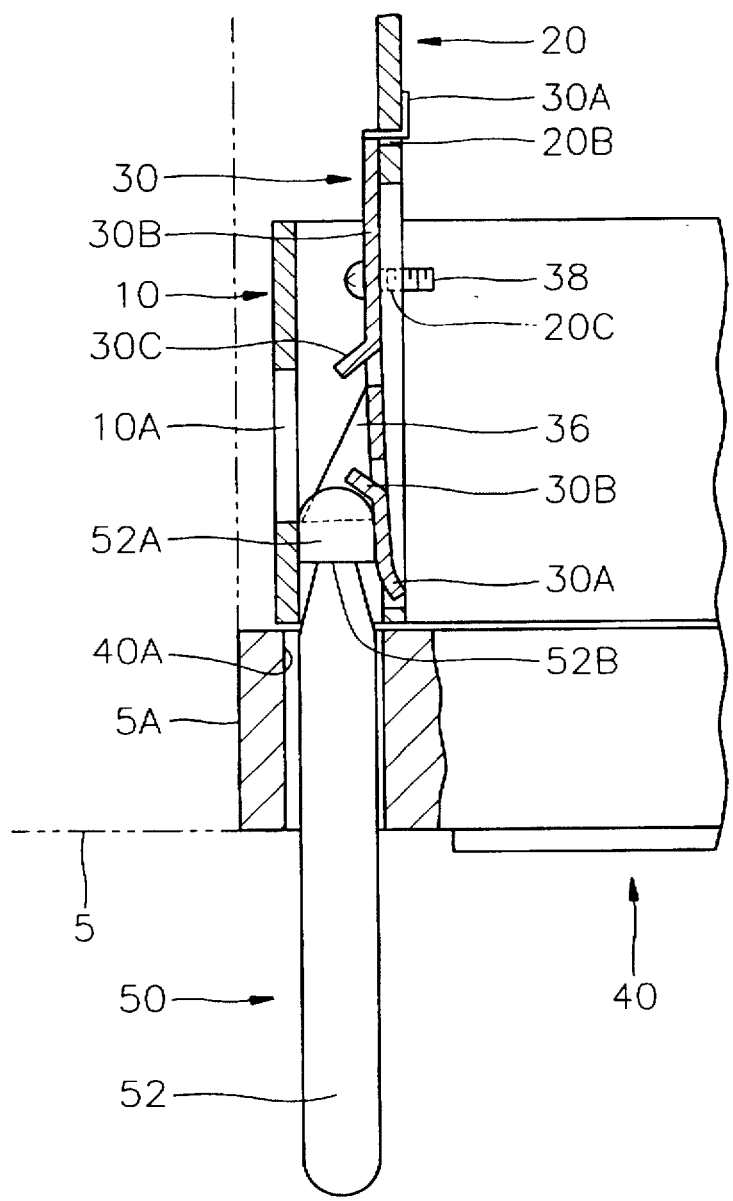

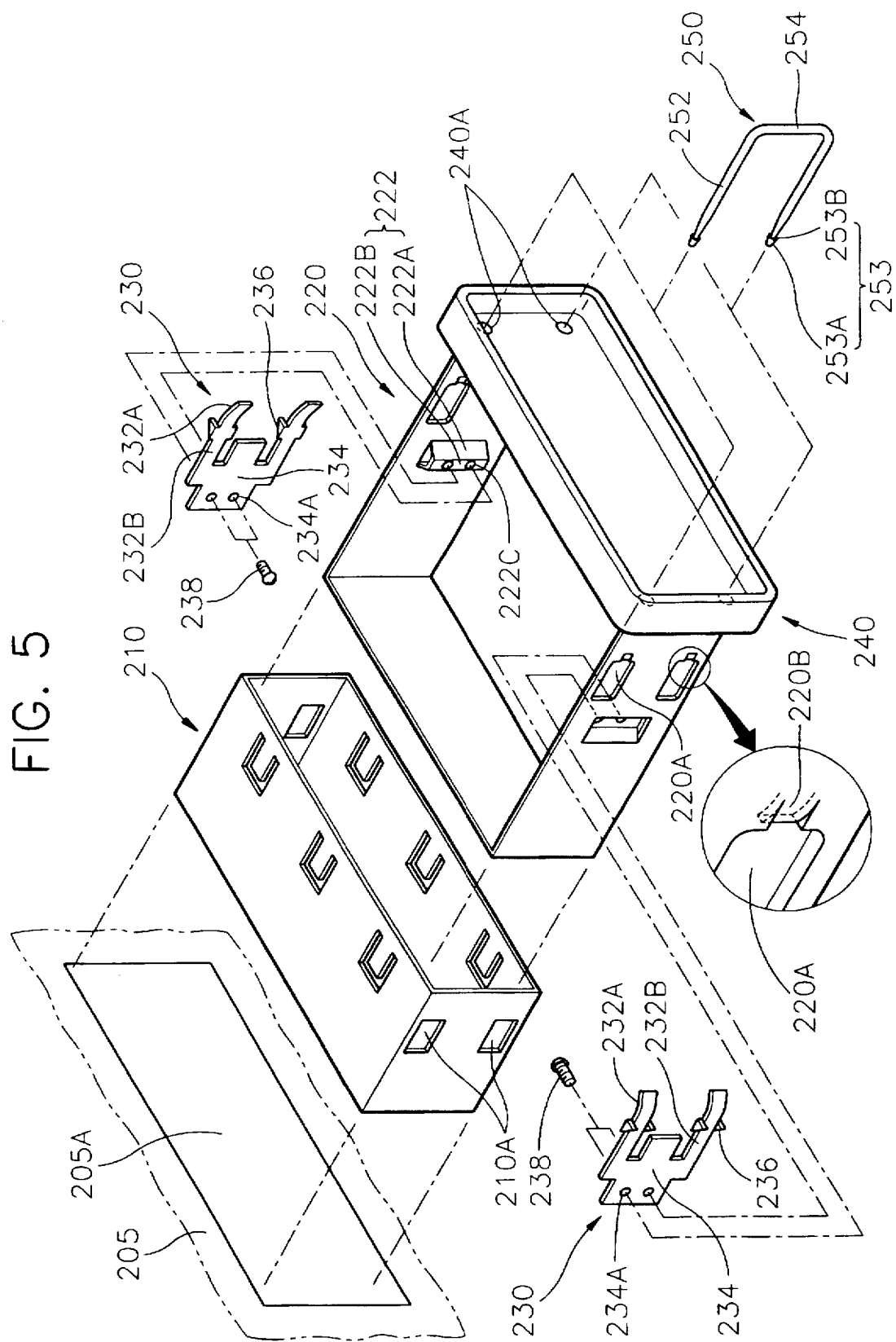

APPARATUS FOR DETACHABLY MOUNTING AUDIO EQUIPMENT

BACKGROUND OF THE INVENTION

1. Field of the Invention

The present invention relates to an apparatus for detachably mounting audio equipment, and more particularly to an improved apparatus for detachably mounting audio equipment by which a main chassis in which audio equipment is accommodated is firmly mounted to a mounting frame, and in which the main chassis is easily and accurately disengaged from the mounting frame by disengagement members.

2. Description of the Prior Art

In general, a vehicle is provided with audio equipment such as a radio set, a cassette player, a compact disc player or the like. Such audio equipment is directly mounted by engaging elements such as screws to an engagement aperture of a dash board of a vehicle, or is mounted to a mounting frame which is inserted into a mounting aperture which is formed on a dash board of a vehicle and fixed to the dash board.

The former method in which audio equipment is directly mounted to a dash board of a vehicle has an advantage in that since no separate mounting frames are necessary, the mounting structure is simple and the audio equipment can be cheaply installed to the vehicle. However, in the former method, since all engaging elements should be disengaged from the dash board in order to separate the audio equipment from the dash board to check or repair the equipment, the separation of the equipment is time-consuming. Further, since the dash board is generally made of a plastic, it can be damaged by frequent engagements or disengagements of the equipment.

Therefore, the latter method, in which audio equipment is attached to a mounting frame which is fixed to a dash board of a vehicle, is recently used. In the indirect method, the audio equipment is easily and detachably mounted to the mounting frame by using a lock mechanism which is provided between the mounting frame and the audio equipment.

An example of detachable apparatus of audio equipment is disclosed in U.S. Pat. No. 4,784,361 issued to Kobayashi Shigetoshi on Nov. 15, 1988 and entitled "Automotive Electronic Device Mounting Assembly". According to the mounting assembly of Shigetoshi, lock claws of an electronic device are engaged with engagement apertures which are formed on both sides of a mounting frame, and the electronic device is thus mounted to the mounting frame. The lock claws are withdrawn toward the interior of the electronic device by an unlocking bar, and the electronic device is thus separated from the mounting frame. A release button is provided on the front face of an escutcheon, and the unlocking bar advances against the energy of a coil spring when the release button is pushed. A base plate of an engagement member having lock claws on both sides thereof is then resiliently deformed, and the lock claws are disengaged from the engagement aperture of the mounting frame.

U.S. Pat. No. 5,216,904 issued to Mikio Isaki and entitled "Handle Device Having a Lock Mechanism for an Audio Equipment" discloses another example of detachable apparatus of audio equipment. In the detachable apparatus of Isaki, an engagement plate is provided on a handle, and a lock lever is provided for engaging with a hook of the engagement plate. A spring is provided to urge the lock lever so as to engage the lock lever with the hook to lock the handle. The handle is released by a slide plate provided to be engaged with the lock lever. A push button is fixed to the slide plate for pushing the slide plate. When the slide plate is pushed, the lock lever is rotated to release the lock lever from the hook.

U.S. Pat. No. 5,381,684 issued to Masateru Kawamura on Jan. 17, 1995 and entitled "Detachable Apparatus for Automotive Audio Equipment" discloses a detachable apparatus in which lock claws are engaged with an engagement aperture formed on an upper wall of a mounting frame. According to the detachable apparatus of Kawamura, lock claws of a lock plate which is provided in an audio equipment body are engaged with an engagement aperture which is formed on the upper wall of the mounting frame, and the audio equipment body is thus mounted to the mounting frame. In the detachable apparatus, when the audio equipment body is separated from the mounting frame, a front panel which is located on the front side of the equipment is separated from the audio equipment body in advance, and a lock releasing key is inserted into a lock releasing aperture of a front panel frame, and the lock releasing key makes contact with an inclined surface of the lock plate and resiliently bend the lock plate downwardly, thereby disengaging the lock claws from the engagement aperture of the mounting frame.

Meanwhile, an apparatus for detachably mounting audio equipment has been developed and used in which disengagement members disengage lock claws of engaged members which are fixed on both side of the main chassis and tip ends of the disengagement members are engaged with latching members of the engagement members so that when the disengagement members is pulled, the main chassis is pulled together with the disengagement members.

FIG. 1 is an exploded perspective view for showing a conventional apparatus for detachably mounting audio equipment.

Referring to FIG. 1, a mounting frame 10 is inserted to a mounting aperture 5A of a dash board 5 and is fixed to the dash board 5. Two engagement apertures 10A are respectively formed on both side walls of the mounting frame 10. When the main chassis 20 is mounted to the main chassis 20, the front edges of the engagement apertures 10A are engaged with lock claws 36 which are integrally protruded from engagement members 30.

The audio equipment is accommodated in the main chassis 20. The main chassis 20 is inserted into the mounting frame 10 and then is detachably mounted to the mounting frame 10 by engagement members 30 which are respectively fixed on the outer surface of the side walls thereof.

Two openings 20A are respectively formed on both the side walls of the main chassis 20. When prong portions 32 of each engagement member 30 make contact with a disengagement member 50, the prong portions 32 of each engagement member 30 are resiliently deformed through the corresponding openings 20A toward the interior of the main chassis 20.

A tapped hole 22C is formed on each of the side walls of the main chassis 20 at a position between the upper and lower openings 20A of the side wall. An insertion aperture 20B, into which an insertion portion 30A of each engagement member 30 is inserted, is formed rearward from the tapped hole 22C on each of the side walls of the main chassis 20.

Screws 38 are inserted into through-holes 30 of the engagement members 30 and engaged with the tapped holes 22C, and thus the engagement members 30 are fixed on the outer surface of the corresponding side walls of the main chassis 20. As shown in FIG. 1, each of the engagement members 30 is a trident-shaped plate and has two prong portions 32 and a mounting portion 30A between the prong portions 32.

Each of the prong portions 32 of the engagement members 30 has an inclined portion 32A which is bent by a predetermined angle toward the interior of the main chassis 20, and has a resiliently deformable portion 32B which is resiliently bent, through the corresponding opening 20A toward the interior of the main chassis 20 when the disengagement member 50 is inserted.

A through-hole 34A is formed on the mounting portion 30A of each of the engagement members 30 so that the corresponding screw 38 is penetrated into the through-hole 34A when the engagement member 30 is mounted to the main chassis 20. The prong portions 32 and the mounting portion 32 of each of the engagement members 30 is bridged by a bridging portion 34.

Two lock claws 36 are bent by ninety degrees, and are protruded outside the main chassis from both edges of the prong portions 32 of the engagement members 30. The lock claws 36 are formed on the deformable portions 32B rearward from the inclined portions 32A. Each of the lock claws 34 are a plate of a substantially right-angle triangle, and has a vertical surface on the front side thereof and an inclined surface on the rear side thereof. Each of the lock claws 34 is engaged with the corresponding engagement aperture 10A of the mounting frame 10, and the main chassis 20 is thus mounted to the mounting frame 10.

Formed at a widthwise central portion of each of the prong portions 32 are a latching portion 30B which is formed adjacent to the lock claws 36 and is engaged with the corresponding jaw 52B of the disengagement member 50, and a stopper 30C which limits rearward movement of the disengagement member 50. The latching portions 30B and the stoppers 30C are formed by cutting off some portions of the prong portions 32 so as to be U-shaped and bending the cut-off portions outside the main chassis at an acute angle, and the free ends of the latching portions 30B and the stoppers 30C are bent toward the rear and front sides of the prong portions 30, respectively.

A front frame 40 in which an audio panel (not shown) is accommodated, is fixed to the main chassis 10 by screws (not shown) on the front side of the main chassis 10. The area of the rear wall of the front frame 40 is larger than the front area of the mounting frame 10, so the rear wall of the front frame 40 is blocked by the front edges of the mounting frame 10 when the main chassis 20 is inserted into the mounting frame 10.

Insertion holes 40A for inserting the disengagement members 50 therethrough are formed on the side walls of the front frame 40 at heights corresponding to the engagement apertures 10A of the mounting frame 10 and at positions such that the tip ends of the disengagement member 50 make contact with the corresponding inclined portions 32A of the engagement member 30 when the disengagement members 50 is inserted therethrough.

The conventional apparatus includes disengagement members 50 which disengage the engagement members 10 from the mounting frame 10 when the main chassis 20 is separated from the mounting frame 10. Each of the disengagement members 50 is substantially U-shaped and has two insertion portions 52 and a connecting portion 54 which connects the insertion portions 52 with each other. At each end of the insertion portions 52 is provided a head portion 52A and a jaws 52B which is formed on the head portion 52A.

According to the conventional apparatus, when the disengagement members 50 are inserted from the front side of the mounting frame 10, the inclined surfaces of the lock claws 36 of the engagement members 30 which are fixed to the outer surfaces of the main chassis 20 make contact with the front edges of the mounting frame 10.

When the disengagement members 50 are further inserted, the deformable portions 32B are resiliently deformed toward the interior of the main chassis 20 and proceed to the front edges of the engagement apertures 10A of the mounting frame 10, the tip points of the lock claws 36 being in contact with the inner surfaces of the side walls of the mounting frame 10. At the moment the tip points of the lock claws 36 reaches the engagement apertures 10A, the deformable portions 32B of the engagement members 30 return outside the main chassis 20 by restoring force, and the lock claws 36 of the engagement members 30 are then engaged with the engagement apertures 10A of the mounting frame 10.

Hereinafter, the separation process of the main chassis from the mounting frame according to the above-mentioned conventional apparatus will be explained.

FIGS. 2A through 2C are top cross sectional views for illustrating a disengagement operation of the conventional apparatus. In order to separate the main chassis 20 from the mounting frame 10, the insertion portions 52 of the disengagement members 50 are inserted into the corresponding insertion holes 40A formed on the front frame 40. The insertion portions 52 integrally formed with each of the disengagement members 50 are inserted into the upper and lower insertion holes 40A formed on the rear wall of the front frame 40.

Referring to FIG. 2A, when the disengagement members 50 are inserted, the head portions 52A formed at the tip ends of the disengagement members 50 make contact with the inclined portions of the engagement members 30. When the disengagement members 50 are further inserted, the inclined portions 32A of the engagement members 30 are pressed by the disengagement member 50 and the deformable portions 32B are resiliently bent through the openings 20A of the main chassis 20 toward the interior of the main chassis 20.

As shown in FIG. 2B, when the head portions 52A of the disengagement members 50 reach the deformable portions 32B, the lock claws 36 are moved toward the interior of the main chassis 20 together with the deformable portions 32B and are completely disengaged from the mounting frame 10. When the disengagement members 50 are further inserted, the lock claws 36 are disengaged from the mounting frame 10 and the head portions 52A of the disengagement members 50 proceed toward the tip ends of the latching portions 30B, and make contact with the latching portions 30B of the engagement members 30.

Now referring to FIG. 2C, when the jaws 52B of the disengagement members 50 reach the tip ends of the latching portions 30B, the disengagement members 50 are moved outside the main chassis 20 by restoring force of the deformable portions 32B. The latching portions 30B are then engaged with the jaws 52B of the disengagement members 50. After the jaws 52B of the disengagement members 50 are engaged with the latching portions 30B of the engagement members 30, when the disengagement members 50 are pulled toward the front side of the main chassis 20, the engagement members 30 and the main chassis 20 are moved forward together with the disengagement members 50 and are separated from the mounting frame 10.

According to the conventional apparatus, since the engagement members 30 are engaged with the mounting frame 10 on both sides of the mounting frame 10, the main chassis 20 is stably mounted to the mounting frame 10. Further, since the disengagement members 50 are engaged with the latching portions 30B of the engagement members 30 when the main chassis 20 is separated from the mounting frame 10, the main chassis 20 is easily drawn from the mounting frame 10 by pulling the disengagement members 50.

However, the conventional apparatus has a disadvantage in that the engagement members 30 are occasionally damaged when the latching portions 30B of the engagement members 30 are engaged with the disengagement members 50 and then are pulled. The apparatus has another disadvantage in that since the engagement members 30 are mounted on the outer surfaces of the side walls of the main chassis 20, the main chassis 20 may not be smoothly inserted into or drawn from the mounting frame 10. Further, due to the existence of the insertion holes 20B of the main chassis 20 and to the insertion portion 30A, the latching portions 30B, and the stoppers 30C of the engagement members 30, manufacturing processes of the main chassis 20 and the engagement members 30 are complicated. Moreover, since the engaged member 30 is fixed to the main chassis 20 by one screw 30, the engagement members 30 may be undesirably rotated so that they are not properly engaged with the mounting frame 10 or disengaged by the disengagement members 50 from the mounting frame 50.

SUMMARY OF THE INVENTION

Therefore, it is an object of the present invention to provide an improved apparatus for detachably mounting audio equipment by which a main chassis in which audio equipment is accommodated is firmly mounted to a mounting frame, and in which the main chassis is easily and accurately disengaged from the mounting frame by disengagement members.

In order to achieve the above-mentioned object of the present invention, there is provided an apparatus for detachably mounting audio equipment, whch comprises: a mounting frame in which at least one mounting aperture is formed on each side thereof; a main chassis inserted into and detachably mounted to the mounting frame, in which an opening corresponding to the engagement aperture of the mounting frame is formed on each side thereof; engagement members fixed to the main chassis, each engagement member being engaged with the corresponding engagement aperture of the mounting frame when the main chassis is mounted to the mounting frame and being disengaged from the corresponding engagement aperture of the mounting frame when the main chassis is drawn from the mounting frame; a front frame fixed to the main chassis on the front side of the main chassis, in which an insertion hole corresponding to the engagement aperture of the mounting frame is formed on each side thereof; and disengagement members for disengaging the engagement members from the engagement apertures of the mounting frame by making contact with the engagement members when the disengagement members are inserted into the insertion holes of the front frame, the main chassis being provided with latching members engaged with the disengagement members so that the main chassis is pulled together with the disengagement when the disengagement members are pulled forward.

The latching members are formed on side walls of the main chassis by cutting off the side walls of the main chassis and bending the cut-off portions of the main chassis toward the interior of the main chassis, and the latching members are provided at positions adjacent to the openings of the main chassis on the front side of the openings of the main chassis.

Fixing portions for fixing the corresponding engagement members to the main chassis are formed on side walls of the main chassis, and two tapped holes are formed on each fixing portion, the tapped holes being engaged with screws so that the engagement members are unrotatably fixed to the main chassis.

Each engagement member has an inclined portion bent toward the interior of the main chassis, for making contact with a corresponding insertion end of the disengagement members when the disengagement members are inserted into the insertion holes of the front frame, and a deformable portion integrally formed with the inclined portion, for resiliently bending toward the interior of the main chassis when the corresponding insertion portion of the disengagement members makes contact with the inclined portion.

A pair of lock claws are provided on each side of the lock claws, the lock claws being bent and protruded outside the main chassis so as to be engaged with the corresponding engagement aperture of the mounting frame when the main chassis is mounted to the main chassis.

A truncated conical head portion is integrally formed at each insertion end of the disengagement members, each head portion having an inclined surface and a jaw.

According to the present invention, the main chassis is firmly mounted to the mounting frame. When the disengagement members are pulled, the main chassis is easily drawn by the latching portions of the main chassis. Damages to the engagement members during the pulling of the disengagement members is prevented, and the main chassis and the engagement members are easily manufactured.

BRIEF DESCRIPTION OF THE DRAWINGS

The above object and other advantages of the present invention will become more apparent by describing in detail preferred embodiments thereof with reference to the attached drawings in which:

FIGS. 2A through 2C are top cross sectional views for illustrating a disengagement operation of the conventional apparatus shown in FIG. 1;

FIG. 5 is an exploded perspective view for illustrating an apparatus for detachably mounting audio equipment according to the second embodiment of the present invention.

DETAILED DESCRIPTION OF THE INVENTION

Hereinafter, an apparatus for detachably mounting audio equipment according to preferred embodiments of the present invention will be explained in more detail with reference to the accompanying drawings.

Figure 1:
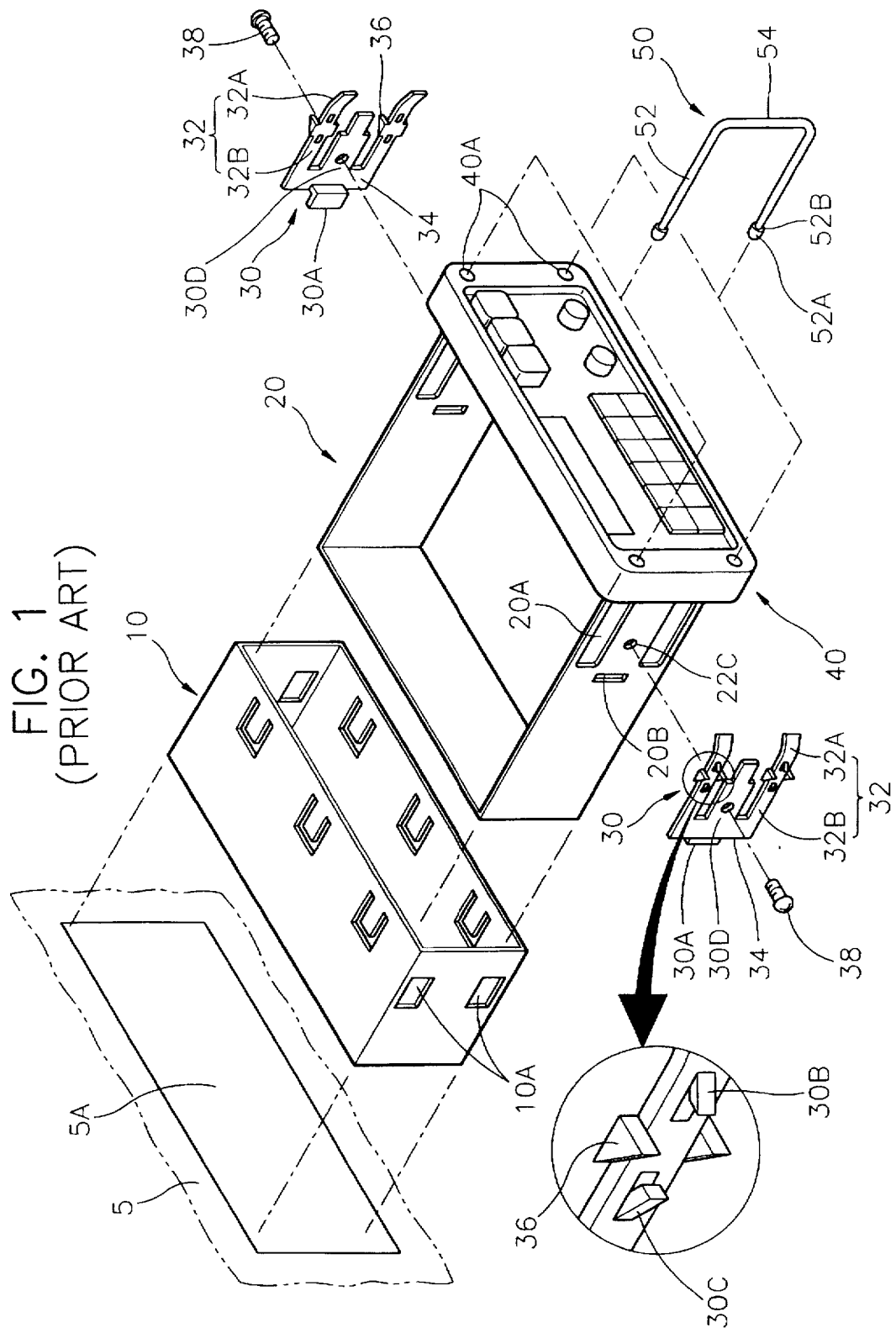
FIG. 1 is an exploded perspective view for showing a conventional apparatus for detachably mounting audio equipment.
Figure 2A:
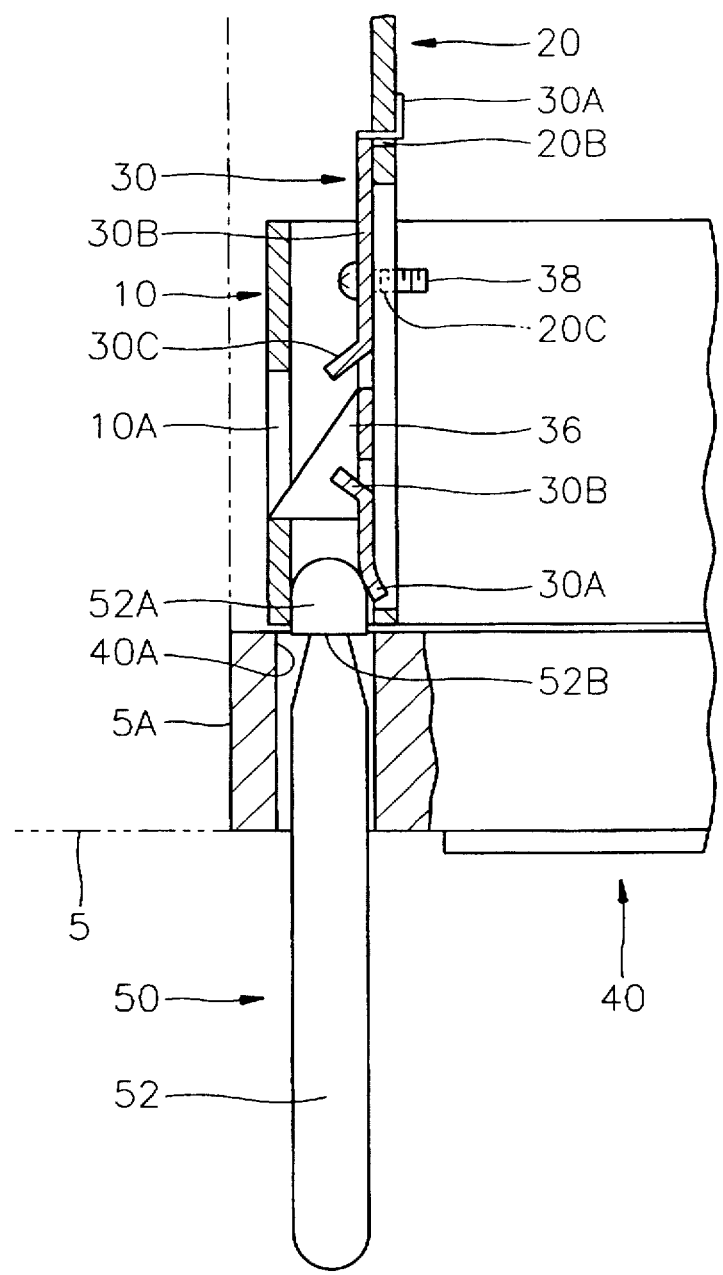
Figure 2C:
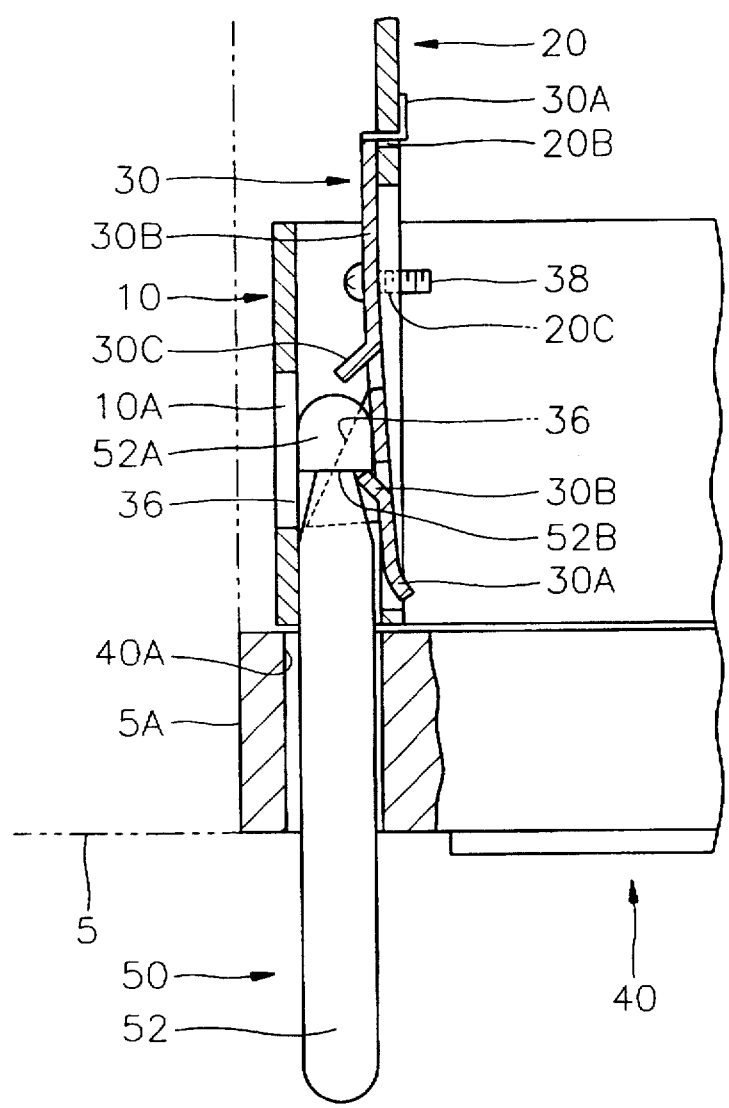
Figure 3:
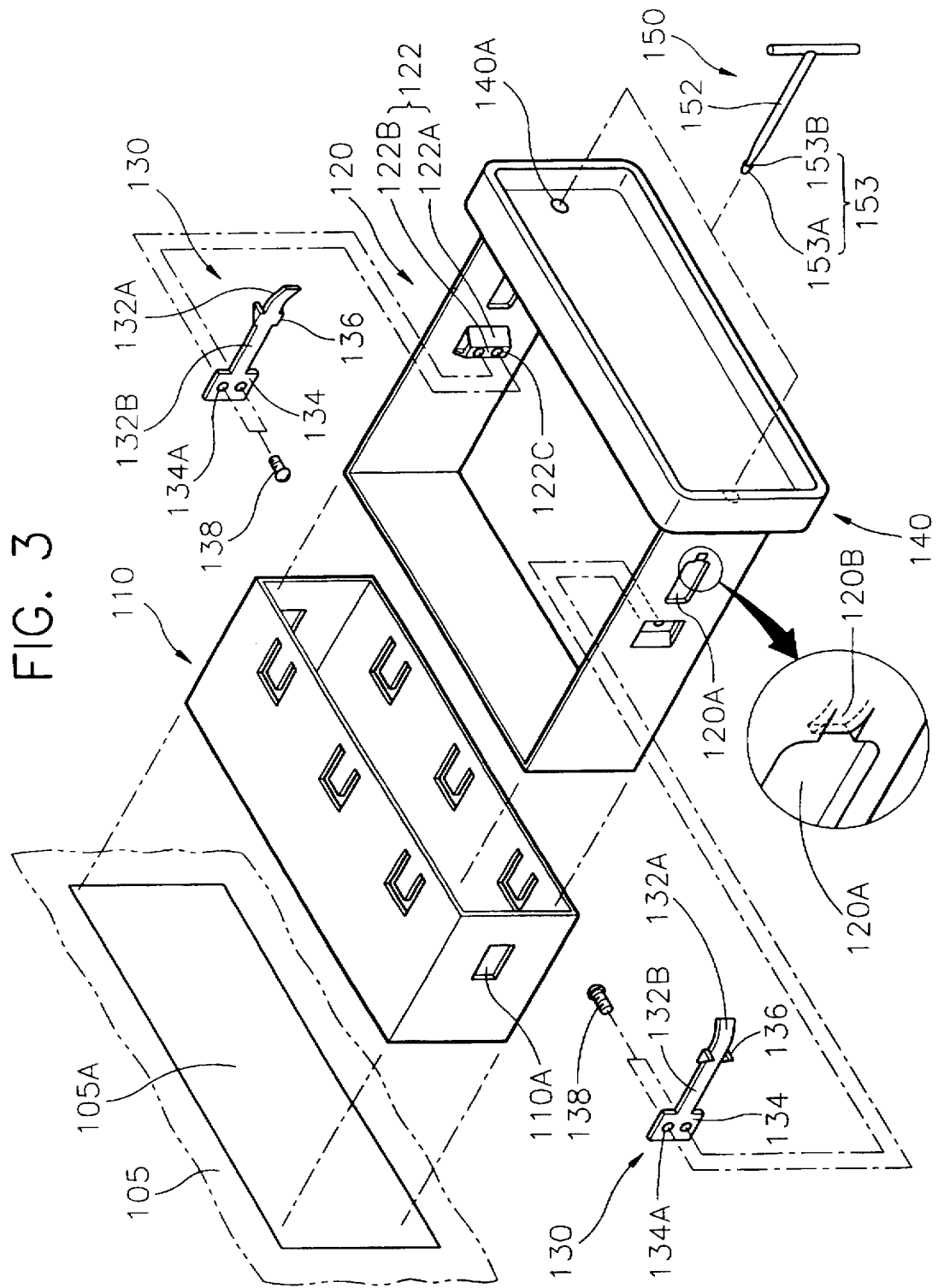
FIG. 3 is an exploded perspective view for illustrating an apparatus for detachably mounting audio equipment according to the first embodiment of the present invention.

FIG. 3 is an exploded perspective view for illustrating an apparatus for detachably mounting audio equipment according to the first embodiment of the present invention. As shown in FIG. 3, the apparatus for detachably mounting audio equipment according to the first embodiment of the present invention includes a mounting frame 110 which is inserted into a mounting aperture 105A of a dash board 105 of a vehicle and fixed to the dash board 105, a main chassis 120 in which audio equipment is accommodated and which is inserted into and mounted to the mounting frame 110, engagement members 130 which are fixed to and engaged with or disengaged from the main chassis 120, a front frame 140 in which an audio panel (not shown) is accommodated and which is provided on the front side of the main chassis 120, and disengagement members 150 which disengage the engagement members 130 from the mounting frame 110 when the main chassis 120 is separated from the mounting frame 110.

The mounting frame 110 is inserted into the mounting frame 105A formed on the dash board 105 and is fixed to the dash board 105 by screws (not shown).

The mounting frame 110 has a substantially box-like shape which is upwardly and downwardly opened, and an engagement aperture 110A is formed on each side wall of the mounting frame 110. In order to stably mount the main chassis 120 to the mounting frame 110, the engagement apertures 110A are formed at a height-wise central portion of the side walls of the main chassis 120. The engagement apertures 110A are substantially rectangular, and the front edges of the engagement apertures 110A are engaged with lock claws 136 which are integrally formed with and protruded from the engagement members 130 when the main chassis 120 is mounted to the mounting frame 110.

The main chassis 120 has a substantially box-like shape which is upwardly opened, and the audio equipment is accommodated therein. The main chassis 120 is inserted into the mounting frame 110, and is mounted by the engagement members 130 to the mounting frame 110.

Openings 120A are formed on side walls of the main chassis 120 at positions corresponding to the engagement apertures 110A of the mounting frame 110 when the main chassis 120 is completely inserted into the mounting frame 110. The openings 120A of the main chassis 120 are substantially rectangular, the lock claws 136 integrally formed with and protruded from the engagement members 130 are penetrated into the openings 120A and engaged with the engagement apertures 110A of the mounting frame 110 when the main chassis 120 is mounted to the mounting frame 110.

A latching portion 120B is formed on the front side of each of the openings 120A. Each of the latching portions 120B is formed by horizontally cutting off, by a distance, two portions of the side walls of the main chassis 120 which are vertically separated from each other by a distance on the front side of the openings 120A, and then by bending the cut-away portion at an acute angle toward the interior of the main chassis 120. When the main chassis 120 is drawn from the mounting frame 110, the latching portions 120B are engaged with the jaws 153B formed at the end portions of the disengagement members 150, so the main chassis 120 is pulled together with the disengagement members 150.

Fixing portions 122 for mounting engagement members 130 to the main chassis 120 are integrally formed on the side walls of the main chassis 120 at height-wise central positions separated rearwardly from the openings 120A.

Each of the fixing portions 122 is formed by horizontally cutting off two portions of the side wall which are vertically separated from each other, and then by pressing the cut-off portions toward the interior of the main chassis 120, and has inclined portions 122A on the upper and lower sides thereof and a bridging portion 122B which bridges the inclined portions 122A. Two tapped holes 122C are formed on each bridging portion 122B of the fixing portions 122 so that the screws 138 for fixing the engagement members 130 to the main chassis 120 are engaged with the tapped holes 122C. The engagement members 130 are unrotatably fixed to the main chassis 120 by screws 138 engaged with the tapped holes 122C. The screws 138 are inserted into the through-holes 134A of the engagement members 130 and engaged with the tapped holes 122C of the fixing portions 122, and the engagement members 130 are thus fixed to the main chassis 120.

The engagement members 130 are fixed to the main chassis 120 by screws 138, and are engaged with the mounting frame 110. As shown in FIG. 3, the engagement members 130 are substantially rectangular plates.

Each of the engagement members 130 has, at one end thereof, an inclined portion 132A which is bent toward the interior of the main chassis 120, and a deformable portion 132B which is substantially the body of the engagement member 130, and is resiliently bent toward the interior of the main chassis 120 when the corresponding disengagement 150 is inserted. Two through-holes 134A, into which the screws 138 is inserted, is formed at the other end of each of the engagement members 130 in order to fix the engagement member 130 to the corresponding fixing portion 122 of the main chassis 120.

The screws 138 are inserted into the through-holes 134A of the engagement members 130 and engaged with the tapped holes 122C of the fixing portions 122, and the engagement members 130 are thus fixed to the main chassis 120. Since each of the engagement members 130 is fixed by two screws 138 to the main chassis 120, unintended rotation of the engagement member 130 is prevented.

A pair of lock claws 130 are bent at ninety degrees and protruded outside the main chassis 120 from the side edges of each of the engagement members 130, which are at positions separated by a distance, toward the end portion in which the through-holes 134A are formed, from the bent portion for forming the inclined portion 132A. The lock claws 134 are a substantially right-angled triangular plate and has a vertical surface on the front side thereof, and an inclined surface on the rear side thereof.

The front frame 140 in which the audio panel (not shown) is accommodated, is fixed to the main chassis 110 on the front side of the main chassis 110 by screws (not shown). The front frame 140, as shown in FIG. 3, has an upwardly opened box-like shape, and the area of the rear wall of the front frame 140 is larger than the front area of the mounting frame 110 so that the rear wall of the front frame 140 is blocked by the front edges of the mounting frame 110 when the main chassis 120 is inserted into the mounting frame 110.

An insertion hole 140A for inserting the disengagement members 150 therethrough is formed on rear wall of the front frame 140 at a height corresponding to the engagement apertures 110A of the mounting frame 110 and at a position such that the tip end of the disengagement 150 makes contact with the inclined portion 132A of the corresponding engagement member 130 when the disengagement member 150 is inserted therethrough.

The disengagement members 150 disengage the engagement members 130 from the mounting frame 110 when the main chassis 120 is drawn from the mounting frame 110. Each of the disengagement members 150 is substantially T-shaped and has an insertion portion 152 which is inserted into the corresponding insertion hole 140A of the front panel 140, and has a knob portion 154. A truncated conical head portion 153 is integrally formed at each free end of the insertion portions 152, and each of the head portions 153 has an inclined surface 153A and a jaw 153B.

The head portions 152A of the disengagement members 150 disengage the lock claws 136 from the engagement apertures 110A of the mounting frame 110 when the insertion portions 152 of the disengagement members 150 are inserted into the insertion holes 140A of the front frame 140 and make contact with the inclined portions 132A of the engagement members 130, and then move the lock claws 136 toward the interior of the main chassis 120 by resiliently bending the deformable portions 132B toward the interior of the main chassis 120.

When the disengagement members 150 are further inserted, the head portions 153 make contact with the deformable portions 132B of the engagement members 130, and then with the latching portions 120B of the main chassis 120. When the jaws 153B reach the free ends of the latching portions 120B, the head portions 153 of the disengagement members 150 is moved outside the main chassis 120 by pressing forces of the deformable portions 132B, and the jaws 153B of the engagement members 150 are then engaged with the latching portions 120B of the main chassis 120. When the disengagement members 150 are pulled forward in order to draw the main chassis 120 from the mounting frame 110, the main chassis 120 is pulled together with the disengagement members 150.

Hereinafter, the mounting processes of the main chassis to the mounting frame according to the first embodiment of the present invention will be explained.

When the disengagement members 150 are inserted from the front side of the mounting frame 110, the inclined surfaces of the lock claws 136, which are formed on the engagement members 130 and penetrate the openings 120A of the main chassis 120, make contact with the front edges of the mounting frame 110. When the disengagement members 150 are further inserted, the deformable portions 132B of the engagement members 130 is resiliently deformed toward the interior of the main chassis 120, and the tip points of the lock claws 136 make contact with the inner surfaces of the side walls of the mounting frame 110 and proceed to the front edges of the engagement apertures 110A of the mounting frame 110. At the moment the tip points of the lock claws 136 reach the engagement apertures 110A of the mounting frame 110, the deformable portions 132B of the engagement members 130 return outside the main chassis 120 by resilient restoring forces, and the lock claws 136 of the engagement members 130 are engaged with the engagement apertures 110A of the mounting frame 110.

Hereinafter, separation process of the main chassis from the mounting frame according to the first embodiment of the present invention will be explained.

Figure 4A:
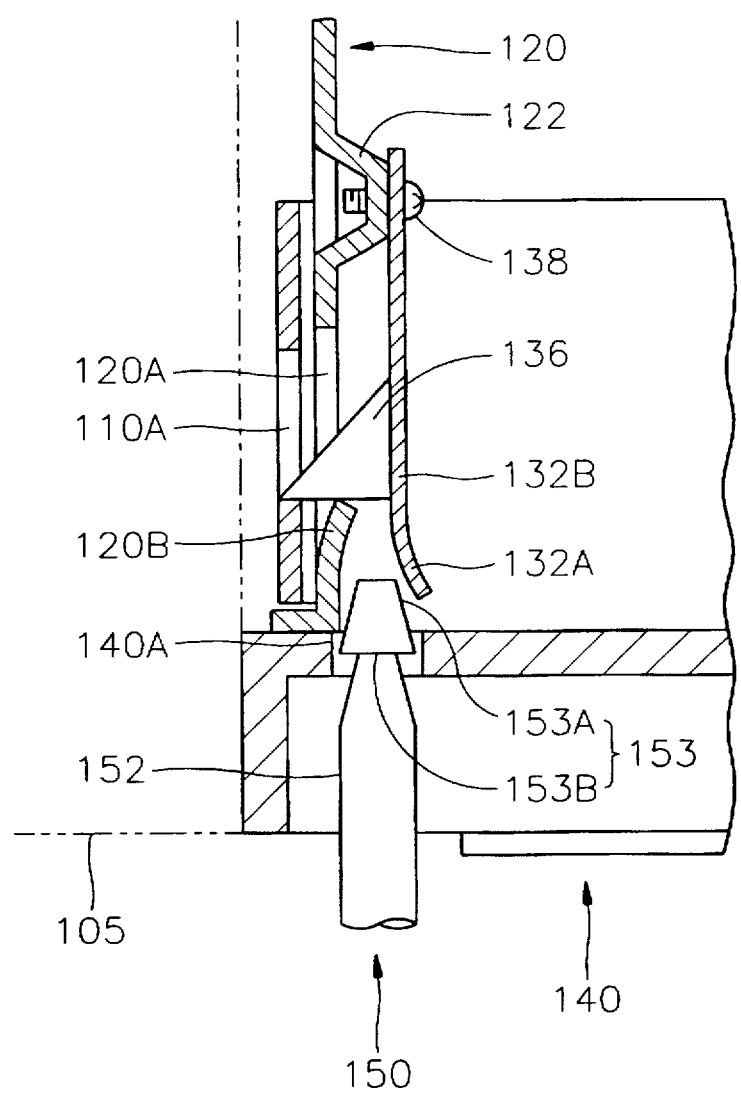
FIGS. 4A through 4C are top cross sectional views for illustrating a disengagement operation of the aparatus for detachably mounting audio equipment shown in FIG. 3.
Figure 4B:
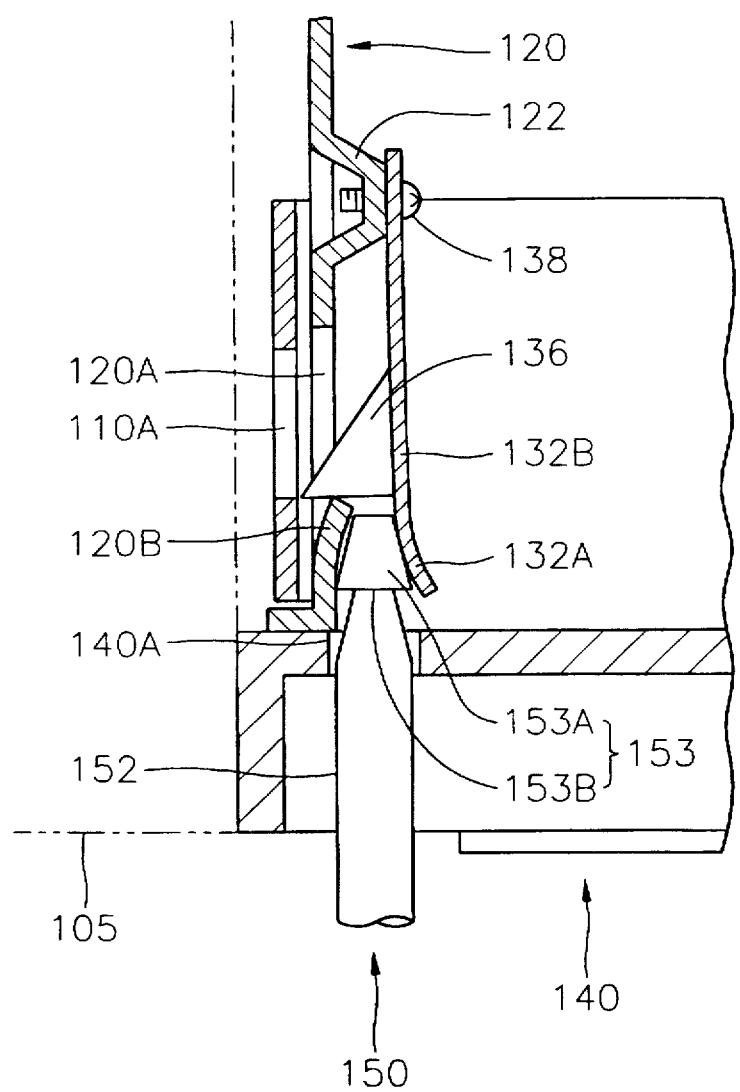
Figure 4C:
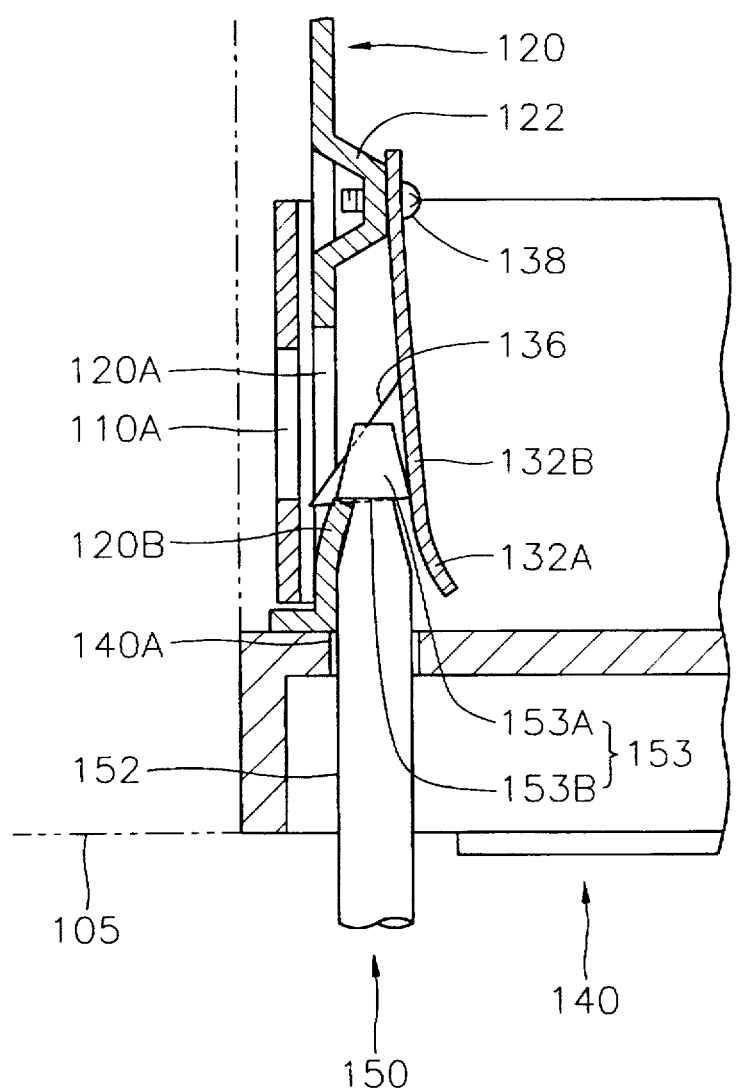

FIGS. 4A through 4C are top cross sectional views for illustrating a disengagement operation of the present invention. Referring to the figures, in order to separate the main chassis 120 from the mounting frame 110, the insertion portions 152 of the disengagement members 150 are inserted into the corresponding insertion holes 140A formed on the front frame 140.

Referring to FIG. 4A, when the disengagement members 150 are inserted, the head portions 152A formed at the tip ends of the disengagement members 150 make contact with the inclined portions 132A of the engagement members 130. When the disengagement member 150 are further inserted, the inclined portions 132A of the engagement members 130 are pressed by the disengagement members 150 and the deformable portions 132B are resiliently bent through the openings 120A of the main chassis 120 toward the interior of the main chassis 120.

As shown in FIG. 4B, when the head portions 152A of the disengagement members 150 reach the deformable portions 132B, the lock claws 136 are moved toward the interior of the main chassis 120 together with the deformable portions 132B and are completely disengaged from the mounting frame 110. When the disengagement members 150 are further inserted, the lock claws 136 are disengaged from the mounting frame 110 and the head portions 153 of the disengagement members 150 proceed toward the tip ends of the latching portions 120B, and make contact with both the latching portions 130B of the engagement members 130 and the deformable portions 132B of the engagement members 130 between them.

Now referring to FIG. 4C, when the jaws 153B of the disengagement members 150 reach the tip ends of the latching portions 120B of the main chassis 120, the disengagement members 150 are moved outside the main chassis 120 by the restoring force of the deformable portions 132B. The latching portions 120B of the main chassis 120 are then engaged with the jaws 152B of the disengagement members 150. When the jaws 152B of the disengagement members 150 are engaged with the latching portions 120B of the main chassis 120 and the disengagement members 150 are then pulled toward the front side of the main chassis 120, the main chassis 120 is moved forward together with the disengagement members 150, and thus are drawn from the mounting frame 110.

FIG. 5 is an exploded perspective view for illustrating an apparatus for detachably mounting audio equipment according to the second embodiment of the present invention. As shown in FIG. 5, the apparatus for detachably mounting audio equipment according to the second embodiment of the present invention includes a mounting frame 210 which is inserted into a mounting aperture 205A of a dash board 205 of a vehicle and fixed to the dash board 205, a main chassis 220 in which audio equipment is accommodated and which is inserted into and mounted to the mounting frame 210, engagement members 230 which are fixed to and engaged with or disengaged from the main chassis 220, a front frame 240 in which an audio panel (not shown) is accommodated and which is provided on the front side of the main chassis 220, and disengagement members 250 which disengage the engagement members 230 from the mounting frame 210 when the main chassis 220 is separated from the mounting frame 210.

The mounting frame 210 has a substantially box-like shape which is upwardly and downwardly opened, and two engagement apertures 210A are formed on each side wall of the mounting frame 210. The engagement apertures 210A are substantially rectangular, and the front edges of the engagement apertures 210A are engaged with lock claws 236 which are integrally formed with and protruded from the engagement members 230 when the main chassis 220 is mounted to the mounting frame 210.

Openings 220A are formed on side walls of the main chassis 220 at positions corresponding to the engagement apertures 210A of the mounting frame 210 when the main chassis 220 is completely inserted into the mounting frame 210. The openings 220A of the main chassis 220 are substantially rectangular and the lock claws 236 integrally formed with and protruded from the engagement members 230 are penetrated into the openings 220A and engaged with the engagement apertures 210A of the mounting frame 210 when the main chassis 220 is mounted to the mounting frame 210.

A latching portion 220B is formed on the front side of each of the openings 220A. Each of the latching portions 220B is formed by horizontally cutting off, by a distance, two portions of the side walls of the main chassis 220, which are vertically separated from each other by a distance, on the front side of the openings 220A, and then by bending the cutaway portion at an acute angle toward the interior of the main chassis 220. When the main chassis 220 is drawn from the mounting frame 210, the latching portions 220B are engaged with the jaws 253B formed at the end portions of the disengagement members 250, and the main chassis 220 is thus pulled together with the disengagement members 250.

Fixing portions 222 for mounting engagement members 230 to the main chassis 220 are integrally formed on the side walls of the main chassis 220 at height-wise central positions separated rearwardly from the openings 220A.

Each of the fixing portions 222 is formed by horizontally cutting off two portions of the side wall, which are vertically separated from each other, and then by pressing the cut-off portions toward the interior of the main chassis 220, and has inclined portions 222A on the upper and lower sides thereof and a bridging portion 222B which bridges the inclined portions 222A. Two tapped holes 222C are formed on each bridging portion 222B of the fixing portions 222 and the screws 238 for fixing the engagement members 230 to the main chassis 220 are engaged with the tapped holes 222C. The engagement members 230 are unrotatably fixed to the main chassis 220 by screws 238 engaged with the tapped holes 222C. The screws 238 are inserted into the through-holes 234A of the engagement members 230 and engaged with the tapped holes 222C of the fixing portions 222, and the engagement members 230 are thus fixed to the main chassis 220.

The engagement members 230 are fixed to the main chassis 220 by screws 238, and are engaged with the mounting frame 210. As shown in FIG. 5, each of the engagement members 230 is a substantially a U-shaped plate, and has two prong portions 232.

Each of prong portions 232 of the engagement members 230 has, at the free end thereof, an inclined portion 232A which is bent toward the interior of the main chassis 120, and a deformable portion 232B which is substantially the body of the prong portion 232 and is resiliently bent toward the interior of the main chassis 220 when the corresponding insertion 252 of the disengagement members 250 is inserted. The distance between the prong portions 232 of each disengagement member 250 is substantially the same as the distance between the openings 220A of each sidewall of the main chassis 220.

The prong portions 232 of each engagement member 230 are bridged by bridging portion 234 which is integrally formed with the prong portions 232.

Two through-holes 234A are formed on the mounting portion 234 of each of the engagement members 230, and the corresponding screws 238 are penetrated into the through-holes 234A when the engagement member 230 is mounted to the main chassis 220. The prong portions 32 and the mounting portion 32 of each of the engagement member 30 is bridged by a bridging portion 34. The screws 238 are inserted into the through-holes 234A of the engagement members 230 and engaged with the tapped holes 222C of the fixing portions 222, and the engagement members 230 are thus fixed to the main chassis 220. The engagement members 230 are mounted to the main chassis 220 such that the prong portions 232 of the engagement members 230 are located substantially at height-wise positions in which the corresponding openings 220A are located.

A pair of lock claws 230 are bent at ninety degrees and extended outside the main chassis 220 from the side edges of each prong portions 232 of the engagement members 230, at positions separated by a distance, toward the end portion in which the through-holes 234A are formed, from the bent portion for forming the inclined portion 232A. The lock claws 234 are a substantially right-angled triangular plate, and has a vertical surface on the front side thereof, and an inclined surface on the rear side thereof.

The front frame 240 in which the audio panel (not shown) is accommodated, is fixed to the main chassis 210 on the front side of the main chassis 210 by screws (not shown). The front frame 240, as shown in FIG. 3, has an upwardly opened box-like shape, and the area of the rear wall of the front frame 240 is larger than the front area of the mounting frame 210, so that the rear wall of the front frame 240 is blocked by the front edges of the mounting frame 210 when the main chassis 220 is inserted into the mounting frame 210.

An insertion hole 240A for inserting the disengagement members 250 therethrough is formed on each side wall of the front frame 240 at a height corresponding to the engagement apertures 210A of the mounting frame 210 and at a position such that the tip end of the disengagement 250 makes contact with the inclined portion 232A of the corresponding engagement member 230 when the disengagement member 250 is inserted therethrough.

The disengagement members 250 disengage the engagement members 230 from the mounting frame 210 when the main chassis 220 is drawn from the mounting frame 210. Each of the disengagement members 250 is substantially T-shaped and has an insertion portion 252 which is inserted into the corresponding insertion hole 240A of the front panel 240, and has a knob portion 254. A truncated conical head portion 253 is integrally formed at each free end of the insertion portions 252, and each of the head portions 253 has an inclined surface 253A and a jaw 253B.

The head portions 252A of the disengagement members 250 disengage the lock claws 236 from the engagement apertures 210A of the mounting frame 210 when the insertion portions 252 of the disengagement members 250 are inserted into the insertion holes 240A of the front frame 240, make contact with the inclined portions 232A of the engagement members 230, and then move the lock claws 236 toward the interior of the main chassis 220 by resiliently bending the deformable portions 232B toward the interior of the main chassis 220.

When the disengagement members 250 are further inserted, the head portions 253 make contact with the deformable portions 232B of the engagement members 230, and then with the latching portions 220B of the main chassis 220. When the jaws 253B reach the free ends of the latching portions 220B, the head portions 253 of the disengagement members 250 are moved outside the main chassis 220 by pressing forces of the deformable portions 232B, and the jaws 253B of the engagement members 250 are then engaged with the latching portions 220B of the main chassis 220. When the disengagement members 250 are pulled forward in order to draw the main chassis 220 from the mounting frame 210, the main chassis 220 is pulled together with the disengagement members 250.

The front frame 240 in which the audio panel (not shown) is accommodated, is fixed to the main chassis 210 on the front side of the main chassis 210 by screws (not shown). Insertion holes 240A for inserting the disengagement members 250 therethrough are formed on rear wall of the front frame 240, at heights corresponding to the engagement apertures 210A of the mounting frame 210 and at positions such that the tip ends of the disengagement 250 makes contact with the inclined portions 232A of the corresponding engagement member 230 when the disengagement members 250 are inserted therethrough.

The disengagement members 250 disengage the engagement members 230 from the mounting frame 210 when the main chassis 220 is drawn from the mounting frame 210. Each of the disengagement members 250 is substantially U-shaped and has two insertion portion 252 which are inserted into the corresponding insertion holes 240A of the front panel 240, and has a knob portion 254. A truncated conical head portion 253 is integrally formed at each free end of the insertion portions 252, and each of the head portions 253 has an inclined surface 253A and a jaw 253B.

The head portions 252A of the disengagement members 250 disengage the lock claws 236 from the engagement apertures 210A of the mounting frame 210 when the insertion portions 252 of the disengagement members 250 are inserted into the insertion holes 240A of the front frame 240 and make contact with the inclined portions 232A of the engagement members 230, and then move the lock claws 236 toward the interior of the main chassis 220 by resiliently bending the deformable portions 232B toward the interior of the main chassis 220.

When the disengagement members 250 are further inserted, the head portions 253 make contact with the deformable portions 232B of the engagement members 230 and then with the latching portions 220B of the main chassis 220. When the jaws 253B reach the free ends of the latching portions 220B, the head portions 253 of the disengagement members 250 is moved outside the main chassis 220 by pressing forces of the deformable portions 232B, and the jaws 253B of the engagement members 250 are then engaged with the latching portions 220B of the main chassis 220. When the disengagement members 250 are pulled forward in order to draw the main chassis 220 from the mounting frame 210, the main chassis 220 is pulled together with the disengagement members 250.

The processes of mounting and separating the main chassis 220 to and from the mounting frame 210 according to the second embodiment of the present invention are similar to those according to the first embodiment of the present invention, the explanation of the processes will be omitted.

As above-described, according to the detachable apparatus of the present invention, since the engagement members 130 and 230 are fixed to the mounting frame 110 and 210 on both sides of the mounting frame 110 and 210, the main chassis 120 and 220 is stably mounted to the mounting frame 110 and 210. Further, since the disengagement members 150 and 250 are engaged with the latching portions 120B and 220B of the main chassis 120 and 220 when the main chassis 120 and 220 is separated from the mounting frame 110 and 210, the main chassis 120 and 220 is easily drawn from the mounting frame 110 and 210 by pulling the disengagement members 150 and 250.

In addition, since the latching portions 120B and 220B are formed on the main chassis 120 and 220, damages to the engagement members 130 and 230 are effectively prevented when the disengagement members 150 and 250 are pulled. The engagement members 130 and 230 are mounted on the inner side of the side walls of the main chassis 120 and 220, so the main chassis 120 and 220 is inserted into and drawn from the mounting frame 110 and 210 with ease. Furthermore, since the main chassis 110 and 210 and the engagement members 130 and 230 according to the present invention has simple structures, they can be easily manufactured as compared to the above-mentioned conventional apparatus. Each of the engagement members are fixed, by two screws 138 and 238, and the unintended rotations of the engagement members 130 and 230 are prevented.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. An apparatus for detachably mounting audio equipment, which comprises:

a mounting frame in which at least one mounting aperture is formed on each side thereof;

a main chassis having side walls and being inserted into and detachably mounted to the mounting frame, in which an opening corresponding to the engagement aperture of the mounting frame is formed on each side thereof;

engagement members fixed to an interior surface of the side walls of the main chassis, each engagement member being engaged with the corresponding engagement aperture of the mounting frame when the main chassis is mounted to the mounting frame and being disengaged from the corresponding engagement aperture of the mounting frame when the main chassis is drawn from the mounting frame;

a front frame fixed to the main chassis on the front side of the main chassis, in which an insertion hole corresponding to the engagement aperture of the mounting frame is formed on each side thereof; and disengagement members for disengaging the engagement members from the engagement apertures of the mounting frame by making contact with the engagement members when the disengagement members are inserted into the insertion holes of the front frame, the main chassis being provided with latching members engaged with the disengagement members so that the main chassis is pulled together with the disengagement when the disengagement members are pulled forward.

2. An apparatus for detachably mounting audio equipment according to claim 1, wherein the latching members are formed on side walls of the main chassis by cutting off the side walls of the main chassis and bending the cut-off portions of the main chassis toward the interior of the main chassis.

3. An apparatus for detachably mounting audio equipment according to claim 2, wherein the latching members are provided at positions adjacent to the openings of the main chassis on the front side of the openings of the main chassis.

4. An apparatus for detachably mounting audio equipment according to claim 1, wherein fixing portions for fixing the corresponding engagement members to the main chassis are formed on side walls of the main chassis.

5. An apparatus for detachably mounting audio equipment according to claim 4, wherein two tapped holes are formed on each fixing portion, the tapped holes being engaged with screws so that the engagement members are unrotatably fixed to the main chassis.

6. An apparatus for detachably mounting audio equipment according to claim 1, wherein each engagement member has an inclined portion bent toward the interior of the main chassis, for making contact with a corresponding insertion end of the disengagement members when the disengagement members are inserted into the insertion holes of the front frame, and a deformable portion integrally formed with the inclined portion, for resiliently bending toward the interior of the main chassis when the corresponding insertion portion of the disengagement members makes contact with the inclined portion.

7. An apparatus for detachably mounting audio equipment according to claim 1, wherein a pair of lock claws are provided on each side of the lock claws, the lock claws being bent and protruded outside the main chassis so as to be engaged with the corresponding engagement aperture of the mounting frame when the main chassis is mounted to the main chassis.

8. An apparatus for detachably mounting audio equipment according to claim 1, wherein a truncated conical head portion is integrally formed at each insertion end of the disengagement members, each head portion having an inclined surface and a jaw.

9. An apparatus for detachably mounting audio equipment according to claim 1, wherein an engagement aperture is provided on each side of the mounting frame, each engagement member being a substantially rectangular plate and having an inclined portion bent toward the interior of the main chassis, for making contact with a corresponding insertion end of the disengagement members when the disengagement members are inserted into the insertion holes of the front frame, and a deformable portion integrally formed with the inclined portion, for resiliently bending toward the interior of the main chassis when the corresponding insertion portion of the disengagement members makes contact with the inclined portion.

10. An apparatus for detachably mounting audio equipment according to claim 9, wherein each disengagement member is substantially T-shaped and has an insertion portion inserted into the corresponding insertion hole of the front panel, and a knob portion, and a truncated conical head portion is integrally formed at each free end of the insertion portions, each head portion having an inclined surface and a jaw.

11. An apparatus for detachably mounting audio equipment according to claim 1, wherein two engagement apertures are provided on each side of the mounting frame, each engagement member being a substantially U-shaped plate having two prong portions, each prong portion having an inclined portion bent toward the interior of the main chassis, for making contact with a corresponding insertion end of the disengagement members when the disengagement members are inserted into the insertion holes of the front frame, a deformable portion integrally formed with the inclined portion, for resiliently bending toward the interior of the main chassis when the corresponding insertion portion of the disengagement members makes contact with the inclined portion.

12. An apparatus for detachably mounting audio equipment according to claim 11, wherein each disengagement member is substantially U-shaped and has two insertion portions inserted into the corresponding insertion holes of the front panel, and a connecting portion connecting the insertion portions, and a truncated conical head portion is integrally formed at each free end of the insertion portions, each head portion having an inclined surface and a jaw.

13. An apparatus for detachably mounting audio equipment, which comprises:

a mounting frame in which at least one mounting aperture is formed on each side thereof;

a main chassis having side walls and being inserted into and detachably mounted to the mounting frame, in which an opening corresponding to the engagement aperture of the mounting frame is formed on each side thereof;

engagement members fixed to an interior surface of the side walls of the main chassis, each engagement member being engaged with the corresponding engagement aperture of the mounting frame when the main chassis is mounted to the mounting frame and being disengaged from the corresponding engagement aperture of the mounting frame when the main chassis is drawn from the mounting frame, each engagement member having an inclined portion bent toward the interior of the main chassis, for making contact with a corresponding insertion end of the disengagement members when the disengagement members are inserted into the insertion holes of the front frame, and a deformable portion integrally formed with the inclined portion, for resiliently bending toward the interior of the main chassis when the corresponding insertion portion of the disengagement members makes contact with the inclined portion;

a front frame fixed to the main chassis on the front side of the main chassis, in which an insertion hole corresponding to the engagement aperture of the mounting frame is formed on each side thereof; and disengagement members for disengaging the engagement members from the engagement apertures of the mounting frame by making contact with the engagement members when the disengagement members are inserted into the insertion holes of the front frame, the main chassis being provided with latching members engaged with the disengagement members so that the main chassis is pulled together with the disengagement when the disengagement members are pulled forward.

14. An apparatus for detachably mounting audio equipment according to claim 13, wherein the latching members are formed on side walls of the main chassis by cutting off the side walls of the main chassis and bending the cut-off portions of the main chassis toward the interior of the main chassis.

15. An apparatus for detachably mounting audio equipment according to claim 13, wherein fixing portions for fixing the corresponding engagement members to the main chassis are formed on side walls of the main chassis and two tapped holes are formed on each fixing portion, the tapped holes being engaged with screws so that the engagement members are unrotatably fixed to the main chassis.

16. An apparatus for detachably mounting audio equipment according to claim 13, wherein a pair of lock claws are provided on each side of the lock claws, the lock claws being bent and protruded outside the main chassis so as to be engaged with the corresponding engagement aperture of the mounting frame when the main chassis is mounted to the main chassis.

17. An apparatus for detachably mounting audio equipment according to claim 13, wherein a truncated conical head portion is integrally formed at each insertion end of the disengagement members, each head portion having an inclined surface and a jaw.

18. An apparatus for detachably mounting audio equipment according to claim 13, wherein an engagement aperture is provided on each side of the mounting frame, each engagement member being a substantially rectangular plate and having an inclined portion bent toward the interior of the main chassis, for making contact with a corresponding insertion end of the disengagement members when the disengagement members are inserted into the insertion holes of the front frame, and a deformable portion integrally formed with the inclined portion, for resiliently bending toward the interior of the main chassis when the corresponding insertion portion of the disengagement members makes contact with the inclined portion, each disengagement member being substantially T-shaped and having an insertion portion inserted into the corresponding insertion hole of the front panel and a knob portion and having a truncated conical head portion integrally formed at each free end of the insertion portions, each head portion having an inclined surface and a jaw.

19. An apparatus for detachably mounting audio equipment according to claim 13, wherein two engagement apertures are provided on each side of the mounting frame, each engagement member being a substantially U-shaped plate having two prong portions, each prong portion having an inclined portion bent toward the interior of the main chassis, for making contact with a corresponding insertion end of the disengagement members when the disengagement members are inserted into the insertion holes of the front frame, a deformable portion integrally formed with the inclined portion, for resiliently bending toward the interior of the main chassis when the corresponding insertion portion of the disengagement members makes contact with the inclined portion, each disengagement member being substantially U-shaped and having two insertion portions inserted into the corresponding insertion holes of the front panel and a connecting portion connecting the insertion portions and having a truncated conical head portion integrally formed at each free end of the insertion portions, each head portion having an inclined surface and a jaw.

* * * * *